United States Patent [19]

Tan et al.

[11] Patent Number: 4,542,290

[45] Date of Patent: Sep. 17, 1985

[54] APPARATUS FOR RECORDING EMISSIONS FROM A RAPIDLY GENERATED PLASMA FROM A SINGLE PLASMA PRODUCING EVENT

[75] Inventors: Tai Ho Tan; Arthur H. Williams, both of Los Alamos, N. Mex.

[73] Assignee: The United States of America as represented by the United States Department of Energy, Washington, D.C.

[21] Appl. No.: 460,529

[22] Filed: Jan. 24, 1983

[51] Int. Cl.$^4$ ............................................. H01J 31/50
[52] U.S. Cl. ............................ 250/213 VT; 250/227; 250/368
[58] Field of Search ................ 250/554, 213 VT, 227, 250/368; 356/316, 317, 338; 313/532-536

[56] References Cited

U.S. PATENT DOCUMENTS

| | | | |
|---|---|---|---|
| 3,622,785 | 11/1971 | Irwin et al. | 250/213 VT |
| 3,873,838 | 3/1975 | Lee | 250/368 |
| 4,164,373 | 8/1979 | Schuss et al. | 356/316 |
| 4,245,154 | 1/1981 | Uehara et al. | 250/227 |
| 4,413,178 | 11/1983 | Mourou et al. | 250/213 VT |
| 4,432,644 | 2/1984 | Demers et al. | 356/316 |

OTHER PUBLICATIONS

"Use of Fiber Optics in the Laser Fusion Environment" by Tan et al., SPIE Proc., vol. 296, pp. 164–169, 1982.

*Primary Examiner*—David C. Nelms
*Attorney, Agent, or Firm*—Samuel M. Freund; Paul D. Gaetjens; Judson R. Hightower

[57] ABSTRACT

An optical fiber-coupled detector visible streak camera plasma diagnostic apparatus. Arrays of optical fiber-coupled detectors are placed on the film plane of several types of particle, x-ray and visible spectrometers or directly in the path of the emissions to be measured and the output is imaged by a visible streak camera. Time and spatial dependence of the emission from plasmas generated from a single pulse of electromagnetic radiation or from a single particle beam burst can be recorded.

12 Claims, 6 Drawing Figures

APPARATUS FOR RECORDING EMISSIONS FROM A RAPIDLY GENERATED PLASMA FROM A SINGLE PLASMA PRODUCING EVENT

This invention is the result of a contract with the Department of Energey (Contract No. W-7405-ENG-36).

BACKGROUND OF THE INVENTION

The present invention relates generally to plasma diagnostic instruments and more particularly to the use of a visible streak camera focused on open ends of optical fibers which transmit visible light pulses generated by various scintillators located in the region of plasma generation in response to emissions therefrom to investigate very rapid plasma formation.

In diagnosing subnanosecond, high energy laser-target or high energy particle beam-target interactions, the use of optical fibers presents two attractive features: (1) miniaturization of detectors permits improved flexibility in placing detectors at the most desirable locations and in greater number than can normally be accommodated; and (2) the detectors are insensitive to electromagnetic noise generated by the laser or particle beam produced plasmas as well as to the high-voltage components associated with the high-energy laser or particle beam system. However, in the vicinity of targets utilized in laser or particle beam fusion experiments, the great flux of X-ray radiation and intense emission of relativistic electrons and fast ions do present serious noise problems which severely limit the straight-forward employment of optical fibers in diagnostic instrumentation. Judicious selection of fiber material and the entrance aperture, proper choice of fiber orientation and shielding, and the use of spectral filter and relay optics, it is possible to overcome some of these difficulties and derive useful information. The extremely high recording speed of the visible streak camera when combined with the flexibility and versatility of optical fibers permits the very difficult subnanosecond laser or particle beam produced plasma diagnostics.

The following properties of streak cameras make such plasma diagnostics possible: 1. sub-100 ps recording speeds; 2. micron spatial resolution; and 3. high sensitivity because of image intensification. Photomultiplier tubes can achieve similar response times but the oscilloscopes required to record photomultiplier output are much slower. Moreover, phototubes have no spatial resolution so that only one fiber output can be detected and recorded by each photomultiplier tube. Ordinary cameras have no time resolution capability and are much less sensitive thereby making them of limited value for plasma diagnostics.

SUMMARY OF THE INVENTION

An object of the instant invention is to provide an apparatus for simultaneously recording temporal and spatial dependence of emission characteristic of a rapidly generated plasma from a single plasma producing event.

Another object of our invention is to provide an apparatus for simultaneously recording temporal and spatial dependence of emission characteristic of plasmas produced from high energy laser-target interactions or from high energy particle beam-target interactions.

Yet another object of the present invention is to provide an apparatus for simultaneously recording temporal and spatial dependence of visible and ultraviolet light emission, X-ray emission, ion, and hot-electron production from a single high energy laser pulse interacting with a suitable target.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention includes means for intercepting the characteristic emission from the rapidly generated plasma whereby a visible light pulse is generated by the interaction of the particular characteristic plasma emission and the intercepting device, one or more fiber optic channels capable of receiving the visible light pulse generated in the intercepting means and transmitting the pulse out of the region of the plasma, a visible streak camera which is imaged on the output end of the fiber channels, and means for triggering the streak camera. It is preferred that the intercepting means includes scintilators. Preferably at least one fiber optic channel is capable of receiving visible light emitted directly by the plasma. In the event that X-ray emission is to be measured, it is preferred that at least one crystal spectrograph is interposed between the region of plasma generation and the intercepting means in order to reduce the background radiation reaching the intercepting means. Generally, energy discrimination is achieved using foils of specific atomic elements as filters. It is also preferred that at least one electron spectrograph is interposed between the region of plasma generation and the intercepting means when electron emission is measured in order to reduce the background radiation reaching the intercepting means and for resolving energy of the electron emission. Preferably, means are provided for collecting visible and ultraviolet light emitted from the plasmas and for concentrating and directing this collected light either onto one of the fibers capable of receiving visible radiation directly or onto an appropriate intercepting means.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
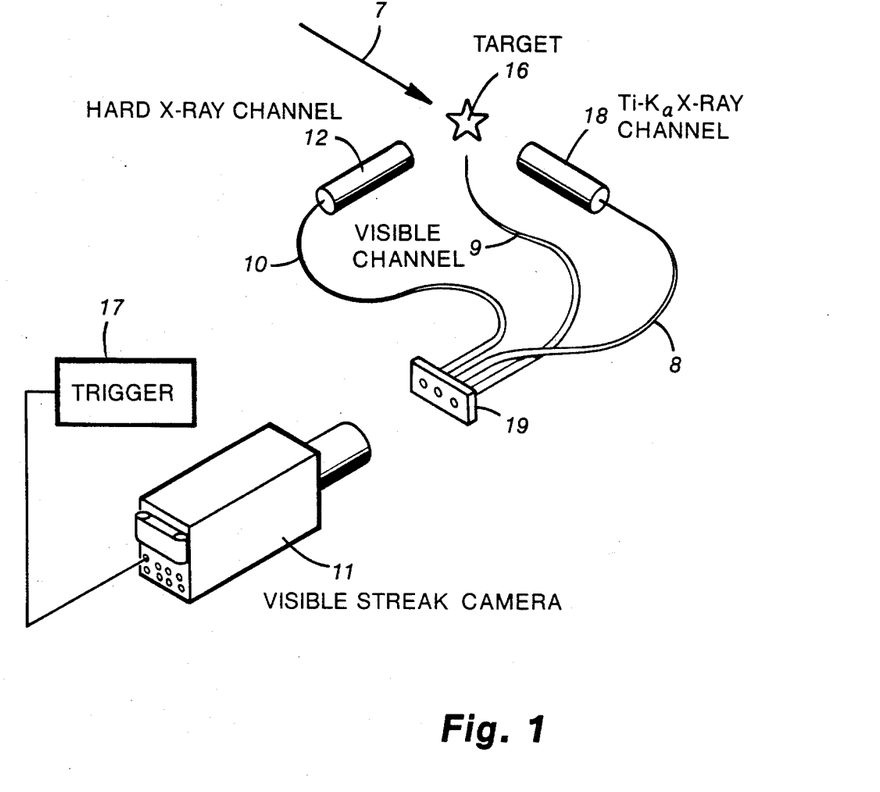
FIG. 1 shows a schematic diagram of a three channel plasma diagnostic system.

Reference will now be made in detail to the present preferred embodiment of the invention, an example of which is illustrated in the accompanying drawings. Turning to FIG. 1, a laser or particle beam 7 strikes a target 16 producing some combination of electromagnetic radiation, electron emission and ion emission. Hard X-ray emission, characteristic X-ray line emission and visible light emission intercepted by three fiber-optic detectors in this embodiment of the present invention. The target 16 was a flat titanium sheet which emitted Ti-$K_\alpha$ X-ray signals when irradiated with a 400 J, 1.6 ns duration $CO_2$ laser pulse. In the Ti-$K_\alpha$ measurement channel, a 3% benzophenone quenched NE111 (Nuclear Enterprises) plastic scintillator 18 (~250 ps decay time) 1.5 m thick and 1 cm in diameter was coupled to a 1 mm quartz optical fiber 8 by a tapered quartz rod. A 25 $\mu$m thick Ti foil was used as a light and X-ray filter and incident electrons were deflected by a permanent magnet in order to reduce the background. The hard X-ray channel which is directly related to the emitted electron flux used a scintillator 12 0.5 cm thick which was filtered by several millimeters of lead or any other high Z element containing material to decrease the emitted light background and that from the softer X-ray emission Finally, the visible channel used a fiber 9 without a scintillator. The fibers 8, 9, 10 were each 30 cm long to minimize fluorescence. Quartz optical fibers were used because of their low fluorescence and high blue and ultraviolet optical transmission which matches the blue output from the scintillators employed. It should be mentioned that the above-mentioned 3% quenched Nuclear Enterprises scintillators employed were used for uv, X-ray and electron emission measurements and could be employed for ion detection as well. Scintillators were index of refraction match bonded to the quartz fibers to reduce unwanted reflections and improve transmission of the generated light pulses to the fibers. A visible streak camera 11 was focused on the ends of the fibers which were brought together into a bundle and held by a holder 19. The streak camera 11 was triggered by an opto-electronic trigger 17.

Figure 2:
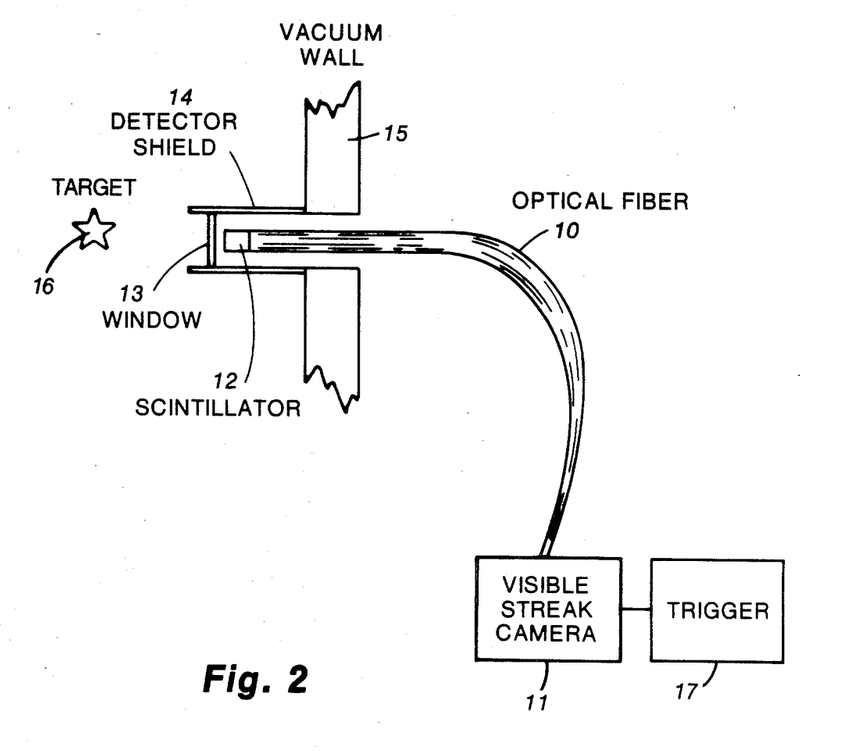
FIG. 2 is a schematic diagram of a typical optical fiber-coupled scintillator-streak camera plasma emission diagnostic apparatus showing the scintillator and optical fiber deployed through a metal vacuum wall.

FIG. 2 is a schematic diagram of a single basic detector channel. A short optical fiber 10 of typically a few meters length was coupled at one end to a scintillator 12 and light pulses appearing at the other end were recorded by the streak camera 11. Since the targets 16 are generally located in a vacuum chamber, most fibers were brought out through the chamber wall 15 by means of a combination which includes a feed-through, a high Z material shield, and an emission transmitting window 12, 13 and 14.

Figure 3:
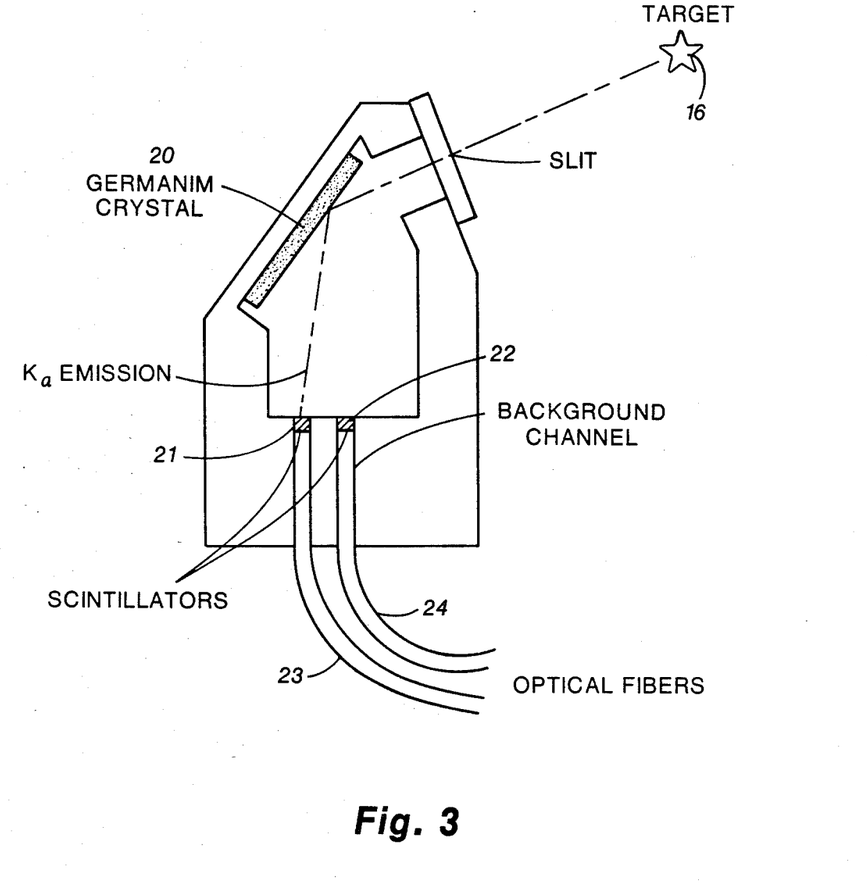
FIG. 3 shows the use of a crystal spectrograph in cooperation with fiber-coupled detector units for the measurement of X-ray emission.

FIG. 3 is a schematic representation of a fiber-coupled X-ray crystal spectrograph. $K_\alpha$ emission from a titanium target 16 impinging on a germanium crystal 20 strikes a first scintillator 21 in the image plane of the spectrograph. This scintillator was a 1.5 $\mu$m thick 3% quenched NE111 scintillator which was matched to the 4.7 keV Ti $K_\alpha$ emission line. A second scintillator 22 measured the background. The scintillators 21 and 22 were connected to optical fibers 23 and 24, respectively, using an optical epoxy, and the output from the fibers recorded by a streak camera. Optical outputs allow the background to be subtracted from the combination of signal and background yielding the desired signal.

Figure 4:
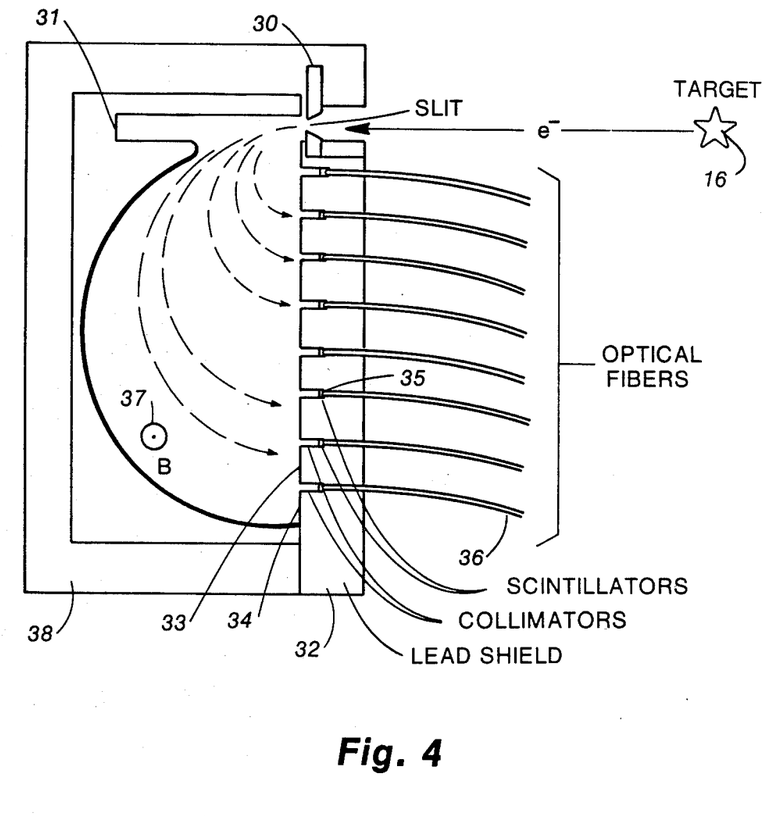
FIG. 4 is a schematic representation of the use of an electron spectrometer with fiber-coupled detector units for the energy resolution of electron emission from plasmas.

FIG. 4 is a schematic representation of a fiber-coupled electron spectrometer which provides continuous electron number measurement from a target 16 as a function of momentum which is related to the distance traveled from the entrance slit 30 through the magnetic field B 37. A beam stop 31 collects extremely energetic electrons and blocks some unwanted emission from reaching scintillators 35. Some electron collimation is achieved by recessing 33, 34 the scintillators 35 into a lead wall 32 which comprises one wall of the spectrometer. Optical fibers 36 carry the visible light pulses generated by the scintillators to a common location which can be imaged and recorded by one or more visible streak cameras.

Figure 5:
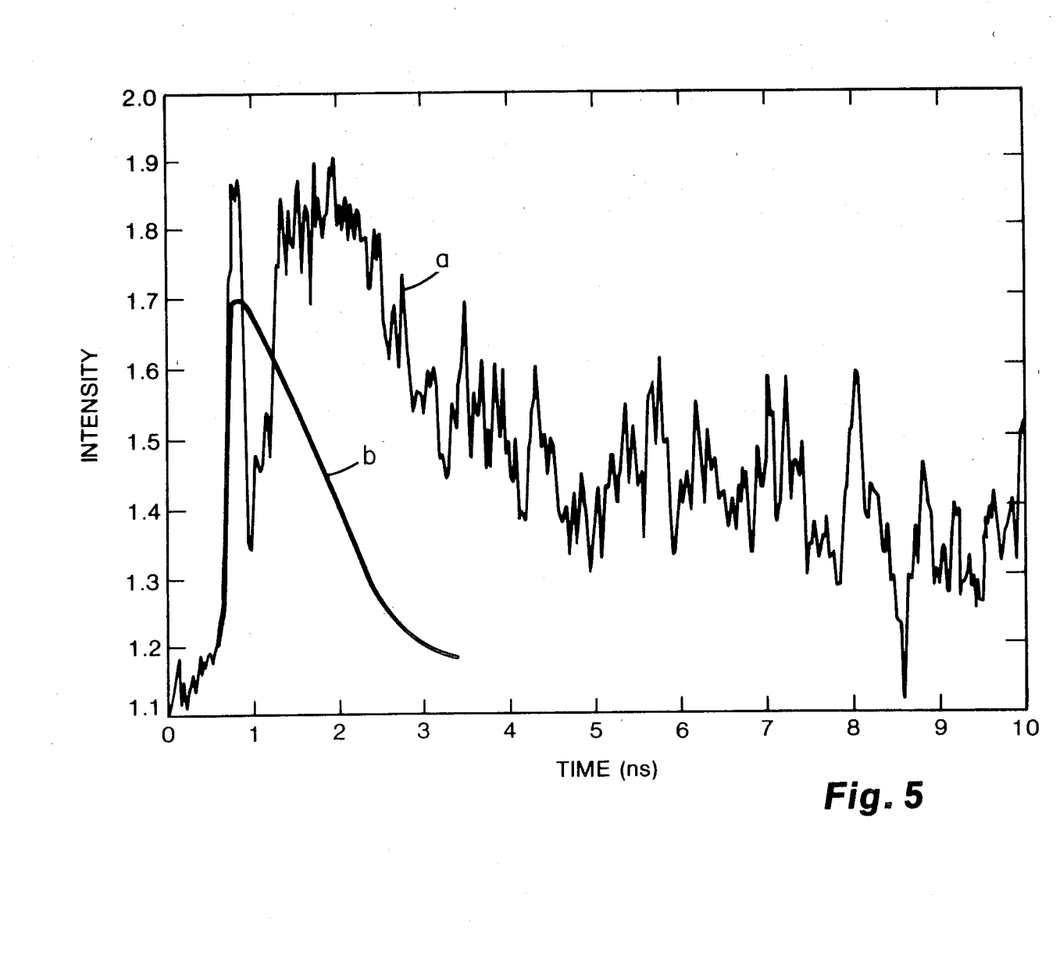
FIG. 5 shows a streak camera recording of the visible light emitted from the interaction of intense $CO_2$ laser energy with a flat titanium target.

FIG. 5a represents a microdensitometer reading from a streak camera recording of visible light emitted when a flat titanium target is irradiated with a 400 J, 1.6 ns duration pulse from a $CO_2$ laser with using an apparatus similar to that described in FIG. 1. A bare optical fiber was used. The ordinate is the film exposure density. Detailed time structure can be observed. The first pulse represents the ultrashort duration harmonic upconversion of the $CO_2$ light on the surface of the irradiated target as the laser intensity builds up. The second, broad pulse, slightly delayed from the first feature, represents the light emitted from the expanding plasma. Curve 5b represents the time history of the $CO_2$ laser pulse.

Figure 6:
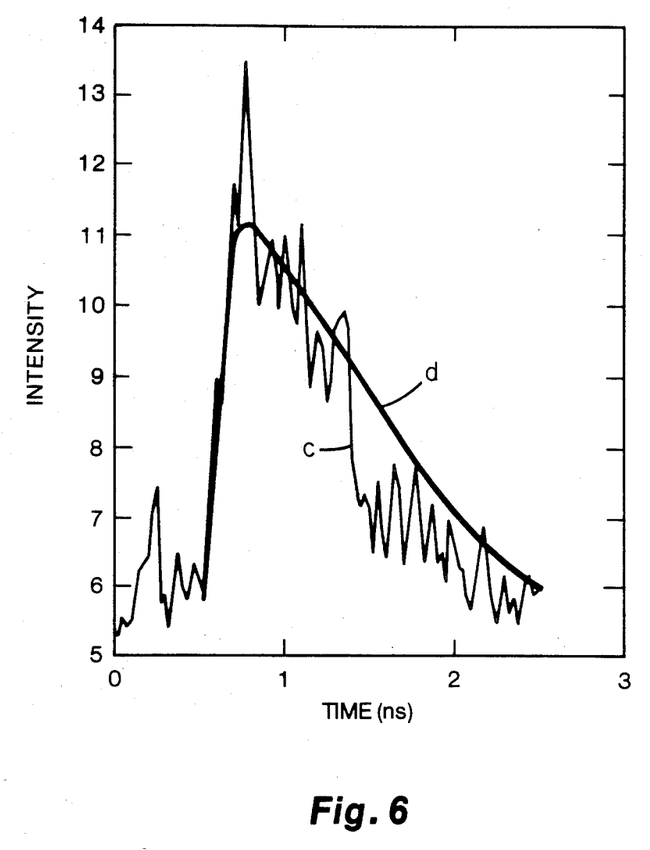
FIG. 6 shows the titanium-$K_\alpha$ X-ray emission from the interaction of intense $CO_2$ laser radiation with a flat titanium target, the visible light from which was detected in FIG. 5.

FIG. 6a shows the time history of the $K_\alpha$ X-ray emission from a plasma generated under conditions similar to those for FIG. 5a. The fluorescence background in the fiber itself is generally constant over a long time period and can readily be subtracted. FIG. 6b represents the time history of the $CO_2$ laser pulse.

It is contemplated by the inventors that arrays of optical fiber-coupled detectors will be placed on the film plane of several types of particle, X-ray, and visible spectrometers and the output is imaged by a visible streak camera for direct signal readout for investigating laser or particle beam fusion as well as other plasma phenomena.

Advantages of the present fiber optic coupled scintillator-streak camera combination include sub-100 ps signal recording speed, simultaneity of multichannel data recording, and freedom from severe electrical disturbances which generally accompany pulsed plasma generation. A further advantage of the present invention is the simple correlation between the visible streak camera output and the actual emission intensity intercepted by the scintillator detectors. Since the scintillator response to electromagnetic radiation and to particles is well-characterized, the streak camera need only be calibrated against a narrow band of visible light emitted by the scintillator.

The foregoing description Of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for simultaneously recording temporal and spatial dependence of at least one emission characteristic of a rapidly generated plasma from a single plasma producing event, which comprises in combination:
   a. means for receiving said characteristic plasma emission and generating at least one visible light pulse in response thereto said characteristic plasma emission receiving means being disposed in the region of plasma generation;
   b. at least one first optically transmitting fiber capable of transmitting said generated visible light pulse said first optically transmitting fiber having an object end and an image end, said object end of said first optically transmitting fiber being positioned substantially in contact with said characteristic plasma emission receiving means and being capable of receiving said generated visible light pulse therefrom, said image end of said first optically transmitting fiber being located away from said region of plasma generation;
   c. at least one second optically transmitting fiber capable of transmitting visible light pulses, said second optically transmitting fiber having an object end and an image end, said object end of said second optically transmitting fiber being disposed in the region of plasma generation and being capable of receiving at least one visible light pulse as one characteristic emission produced directly by said rapidly generated plasma, said image end of said second optically transmitting fiber being located away from said region of plasma generation;
   d. a visible streak camera simultaneously imaged on said image end of said first optically transmitting fiber and on said image end of said second optically transmitting fiber for independently and simultaneously recording at least one of said visible light pulses appearing at said image end of said first optically transmitting fiber and at least one of said visible light pulses appearing at said image end of said second optically transmitting fiber; and
   e. means for triggering said visible streak camera.

2. The apparatus as described in claim 1, wherein means are provided for collecting at least one of said visible light pulses produced directly from said rapidly generated plasma and directing said collected visible light pulse onto said object end of at least one of said second optically transmitting fibers.

3. An apparatus for simultaneously recording temporal and spatial dependence of visible and ultraviolet light emission, X-ray emission, and electron emission from a rapidly generated plasma from a single plasma producing event which comprises in combination:
   a. means for receiving said ultraviolet light emission and generating at least one visible light pulse in response thereto said ultraviolet light emission receiving means being disposed in the region of said plasma generation;
   b. means for receiving said X-ray emission and generating at least one visible light pulse in response thereto said X-ray emission receiving means being disposed in the region of said plasma generation;
   c. means for receiving said electron emission and generating at least one visible light pulse in response thereto said electron emission receiving means being disposed in the region of said plasma generation;
   d. at least one first optically transmitting fiber capable of transmitting said generated visible light pulse from said ultraviolet light emission receiving means, said first optically transmitting fiber having an object end and an image end, said object end of said first optically transmitting fiber being positioned substantially in contact with said ultraviolet light emission receiving means and being capable of receiving said generated visible light pulse therefrom, said image end of said first optically transmitted fiber being located away from said region of plasma generation;
   e. at least one second optically transmitting fiber capable of transmitting visible light pulses, said second optically transmitting fiber having an object end and an image end, said object end of said second optically transmitting fiber being disposed in the region of plasma generation and being capable of receiving said visible light emission produced directly by said rapidly generated plasma, said image end of said second optically transmitting fiber being located away from said region of plasma generation;
   f. at least one third optically transmitting fiber capable of transmitting said generated visible light pulse from said X-ray emission receiving means, said third optically transmitting fiber having an object end and an image end, said object end of said third optically transmitting fiber being positioned substantially in contact with said X-ray emission receiving means and being capable of receiving said generated visible light pulse therefrom, said image end of said third optically transmitting fiber being located away from said region of plasma generation;
   g. at least one fourth optically transmitting fiber capable of transmitting said generated light pulse from said electron emission receiving means, said fourth optically transmitting fiber having an object end and an image end, said object end of said fourth optically transmitting fiber being positioned substantially in contact with said electron emission receiving means and being capable of receiving said generated visible light pulse therefrom, said image end of said fourth optically transmitting fiber being located away from said region of plasma generation;
   h. a visible streak camera simultaneously imaged on said image end of said first optically transmitting fiber, on said image end of said second optically transmitting fiber, on said image end of said third optically transmitting fiber, and on said image end of said fourth optically transmitting fiber for independently and simultaneously recording at least one of said visible light pulses appearing at said image end of said first optically transmitting fiber, at least one of said visible light pulses appearing at said image end of said second optically transmitting fiber, at least one of said visible light pulses appearing at said image end of said third optically transmitting fiber, and at least one of said visible light pulses appearing at said image end of said fourth optically transmitting fiber; and i. means for triggering said visible streak camera.

4. The apparatus as described in claim 3, wherein means are provided for collecting at least one of said visible light pulses produced directly from said rapidly generated plasma and directing said collected visible light pulse onto said object end of at least one of said second optically transmitting fibers.

5. The apparatus as described in claim 4, wherein at least one crystal spectrograph is interposed between said region of plasma generation and said means for receiving said X-ray emission in order to reduce the background radiation reaching said means for receiving said X-ray emission.

6. The apparatus as described in claim 5, wherein at least one electron spectrograph is interposed between said region of plasma generation and said means for receiving said electron emission in order to reduce the background radiation reaching said means for receiving said electron emission and to energy resolve said electron emission.

7. An apparatus for simultaneously recording temporal and spatial dependence of at least one emission characteristic of a rapidly generated plasma from a single plasma producing event which event is selected from the group of processes which includes high energy laser target interactions and high energy electron beam-target interactions, which comprises in combination:
   a. means for receiving said characteristic plasma emission and generating at least one visible light pulse in response thereto said characteristic plasma emission receiving means being disposed in the region of plasma generation;
   b. at least one first optically transmitting fiber capable of transmitting said generated visible light pulse said first optically transmitting fiber having an object end and an image end, said object end of said first optically transmitting fiber being positioned substantially in contact with said characteristic plasma emission receiving means and being capable of receiving said generated visible light pulse therefrom, said image end of said first optically transmitting fiber being located away from said region of plasma generation;
   c. at least one second optically transmitting fiber capable of transmitting visible light pulses, said second optically transmitting fiber having an object end and an image end, said object end of said second optically transmitting fiber being disposed in the region of plasma generation and being capable of receiving at least one visible light pulse as one characteristic emission produced directly by said rapidly generated plasma, said image end of said second optically transmitting fiber being located away from said region of plasma generation;
   d. a visible streak camera simultaneously imaged on said image end of said first optically transmitting fiber and on said image end of said second optically transmitting fiber for independently and simultaneously recording at least one of said visible light pulses appearing at said image end of said first optically transmitting fiber and at least one of said visible light pulses appearing at said image end of said second optically transmitting fiber; and
   e. means for triggering said visible streak camera.

8. The apparatus as described in claim 7, wherein means are provided for collecting at least one of said visible light pulses produced directly from said rapidly generated plasma and directing said collected visible light pulse onto said object end of at least one of said second optically transmitting fibers.

9. An apparatus for simultaneously recording temporal and spatial dependence of visible and ultraviolet light emission, X-ray emission, and electron emission from a rapidly generated plasma from a single plasma producing event which event is selected from the group of processes which includes high energy laser-target interactions and high energy electron-target interactions, which comprises in combination:
   a. means for receiving said ultraviolet light emission and generating at least one visible light pulse in response thereto said ultraviolet light emission receiving means being disposed in the region of said plasma generation;
   b. means for receiving said X-ray emission and generating at least one visible light pulse in response thereto said X-ray emission receiving means being disposed in the region of said plasma generation;
   c. means for receiving said electron emission and generating at least one visible light pulse in response thereto said electron emission receiving means being disposed in the region of said plasma generation;
   d. at least one first optically transmitting fiber capable of transmitting said generated visible light pulse from said ultraviolet light emission receiving means, said first optically transmitting fiber having an object end and an image end, said object end of said first optically transmitting fiber being positioned substantially in contact with said ultraviolet light emission receiving means and being capable of receiving said generated visible light pulse therefrom, said image end of said first optically transmitted fiber being located away from said region of plasma generation;
   e. at least one second optically transmitting fiber capable of transmitting visible light pulses, said second optically transmitting fiber having an object end and an image end, said object end of said second optically transmitting fiber being disposed in the region of plasma generation and being capable of receiving said visible light emission produced directly by said rapidly generated plasma, said image end of said second optically transmitting fiber being located away from said region of plasma generation;
   f. at least one third optically transmitting fiber capable of transmitting said generated visible light pulse from said X-ray emission receiving means, said third optically transmitting fiber having an object end and an image end, said object end of said third optically transmitting fiber being positioned substantially in contact with said X-ray emission receiving means and being capable of receiving said generated visible light pulse therefrom, said image end of said third optically transmitting fiber being located away from said region of plasma generation;
   g. at least one fourth optically transmitting fiber capable of transmitting said generated light pulse from said electron emission receiving means, said fourth optically transmitting fiber having an object end and an image end, said object end of said fourth optically transmitting fiber being positioned substantially in contact with said electron emission receiving means and being capable of receiving said generated visible light pulse therefrom, said image end of said fourth optically transmitting fiber being located away from said region of plasma generation;

h. a visible streak camera simultaneously imaged on said image end of said first optically transmitting fiber, on said image end of said second optically transmitting fiber, on said image end of said third optically transmitting fiber, and on said image end of said fourth optically transmitting fiber for independently and simultaneously recording at least one of said visible light pulses appearing at said image end of said first optically transmitting fiber, at least one of said visible light pulses appearing at said image end of said second optically transmitting fiber, at least one of said visible light pulses appearing at said image end of said third optically transmitting fiber, and at least one of said visible light pulses appearing at said image end of said fourth optically transmitting fiber; and i. means for triggering said visible streak camera.

10. The apparatus as described in claim 9, wherein means are provided for collecting at least one of said visible light pulses produced directly from said rapidly generated plasma and directing said collected visible light pulse onto said object end of at least one of said second optically transmitting fibers 11. The apparatus as described in claim 10, wherein at least one crystal spectrograph is interposed between said region of plasma generation and said means for receiving said X-ray emission in order to reduce the background. radiation reaching said means for receiving said X-ray emission.

12. The apparatus as described in claim 11, wherein at least one electron spectrograph is interposed between said region of plasma generation and said means for receiving said electron emission in order to reduce the background radiation reaching said means for receiving said electron emission and to energy resolve said electron emission.

* * * * *